(12) United States Patent
Leistad et al.

(10) Patent No.: US 12,203,338 B2
(45) Date of Patent: Jan. 21, 2025

(54) METHOD AND APPARATUS FOR CEMENTING AND CLEANING A RESERVOIR LINER

(71) Applicant: ConocoPhillips Company, Houston, TX (US)

(72) Inventors: Hans Martin Leistad, Tananger (NO); Donald R. Girdler, Austin, TX (US); Leif Arne Kvarme, Tananger (NO)

(73) Assignee: CONOCOPHILLIPS COMPANY, Houston, TX (US)

( * ) Notice: Subject to any disclaimer, the term of this patent is extended or adjusted under 35 U.S.C. 154(b) by 301 days.

(21) Appl. No.: 17/087,283

(22) Filed: Nov. 2, 2020

(65) Prior Publication Data
US 2021/0047897 A1    Feb. 18, 2021

Related U.S. Application Data

(63) Continuation of application No. 16/195,541, filed on Nov. 19, 2018, now Pat. No. 10,851,618.

(60) Provisional application No. 62/591,043, filed on Nov. 27, 2017.

(51) Int. Cl.
| | |
|---|---|
| *E21B 37/00* | (2006.01) |
| *C09K 8/42* | (2006.01) |
| *E21B 33/14* | (2006.01) |
| *E21B 34/06* | (2006.01) |
| *E21B 34/10* | (2006.01) |

(Continued)

(52) U.S. Cl.
CPC ............ *E21B 33/14* (2013.01); *E21B 34/063* (2013.01); *E21B 34/10* (2013.01); *E21B 37/00* (2013.01); *E21B 37/10* (2013.01); *E21B 43/10* (2013.01); *C09K 8/42* (2013.01)

(58) Field of Classification Search
CPC ............ E21B 33/13; E21B 33/14; E21B 33/16
See application file for complete search history.

(56) References Cited

U.S. PATENT DOCUMENTS

| | | | | |
|---|---|---|---|---|
| 1,773,941 | A | * | 8/1930 | Boynton ................. E21B 33/14 277/336 |
| 4,192,753 | A | * | 3/1980 | Pye .......................... C09K 8/60 507/139 |

(Continued)

FOREIGN PATENT DOCUMENTS

| | | | | |
|---|---|---|---|---|
| WO | 2017026885 | | 2/2017 | |
| WO | WO2017/058249 | * | 4/2017 | ............ E21B 33/10 |

OTHER PUBLICATIONS

International Search Report, PCT/US2018/061922, mailed Feb. 1, 2019, 3 pgs.

*Primary Examiner* — Cathleen R Hutchins
(74) *Attorney, Agent, or Firm* — CONOCOPHILLIPS COMPANY

(57) ABSTRACT

A procedure and apparatus for cementing and cleaning a reservoir liner 3 comprises installing a reservoir liner using a drill string 4 which extends only as far as the distal end of a cased part 2 of the well, then, using the drill string, displacing cement into the reservoir liner using completion fluid whereby, when the cement is in place in the annulus around the reservoir liner, the reservoir liner is already clean and filled with completion fluid. A ball valve 6 at the top of the reservoir liner 3 is then closed before the cased part 2 of the wellbore is cleaned, to avoid debris entering the reservoir liner.

6 Claims, 2 Drawing Sheets

(51) Int. Cl.
*E21B 37/10* (2006.01)
*E21B 43/10* (2006.01)

(56) References Cited

U.S. PATENT DOCUMENTS

| | | | | |
|---|---|---|---|---|
| 4,558,738 A | * | 12/1985 | Howard, Sr. | E21B 37/02 |
| | | | | 166/173 |
| 4,986,361 A | * | 1/1991 | Mueller | E21B 23/08 |
| | | | | 166/381 |
| 6,484,804 B2 | | 11/2002 | Allamon et al. | |
| 2003/0155114 A1 | | 8/2003 | Pedersen et al. | |
| 2007/0284109 A1 | * | 12/2007 | East | E21B 33/124 |
| | | | | 166/305.1 |
| 2009/0071649 A1 | | 3/2009 | Oakley et al. | |
| 2013/0014953 A1 | | 1/2013 | Van Petegem | |
| 2013/0082202 A1 | * | 4/2013 | Morrison | E21B 33/14 |
| | | | | 251/315.01 |
| 2014/0034310 A1 | | 2/2014 | Andersen | |
| 2014/0054036 A1 | | 2/2014 | Regener et al. | |
| 2014/0326454 A1 | * | 11/2014 | Giroux | E21B 33/143 |
| | | | | 175/57 |

\* cited by examiner

METHOD AND APPARATUS FOR CEMENTING AND CLEANING A RESERVOIR LINER

CROSS-REFERENCE TO RELATED APPLICATIONS

This application is a continuation of U.S. Non-Provisional Application Ser. No. 16/195,541 FILED Nov. 19, 2018, entitled "METHOD AND APPARATUS FOR CEMENTING AND CLEANING A RESERVOIR LINER," which claims benefit under 35 USC § 119(e) to U.S. Provisional Application Ser. No. 62/591,043 FILED Nov. 27, 2017, entitled "METHOD AND APPARATUS FOR CEMENTING AND CLEANING A RESERVOIR LINER," which is incorporated herein in its entirety.

STATEMENT REGARDING FEDERALLY SPONSORED RESEARCH OR DEVELOPMENT

None.

FIELD OF THE INVENTION

This invention relates to the cementing and cleaning of a reservoir liner.

BACKGROUND OF THE INVENTION

When a hydrocarbon well or water injector well is drilled, casing is installed in the upper region of the well and then, normally, a reservoir liner is run into the well on drill pipe equipped with a reservoir liner hanger. During this process, the wellbore is at all times filled with drilling mud for the purpose of balancing the well, and the drillpipe is connected to a source of drilling mud.

Once the reservoir liner is at the intended depth, cement is displaced into the reservoir liner followed by drilling mud; the volume of displaced cement is sufficient to pass back up the annulus outside the reservoir liner to secure the reservoir liner in place. A wiper plug (or cementing plug) may be placed between the cement and the drilling mud, which helps to clean the interior of the reservoir liner of cement as it passes down the reservoir liner following the cement.

The reservoir liner hanger is then set, acting both as an anchor point to secure the reservoir liner to the lower end of the casing, and also as a seal between the casing and reservoir liner bores. Once the reservoir liner hanger is set, it is released from the end of the drill pipe.

There is a risk of residual cement becoming trapped in the upper cased region of the well, e.g. at the shoulder formed at the top of the reservoir hanger. To prevent possible cement debris from falling down into the reservoir liner, the upper region of the well is circulated with mud above the reservoir liner hanger immediately after releasing the drill string from the reservoir liner hanger. Thereafter the drill pipe string is removed from the well. A cleanout string, consisting of drill pipe and special tools like e.g. scrapers, brushes and magnets, is then run into the well, all the way to the bottom of the reservoir liner. The well will then be circulated clean by pumping mud down the cleanout string to lift out larger debris, followed by a wash train consisting of washing chemicals and viscous fluid to clean the well. Finally, the well will be displaced to completion fluid, e.g. water based fluid.

The reservoir liner often has a small inner diameter, and sometimes also has additional inner diameter restrictions due to components like e.g. inflow control devices, etc. To be able to run a cleanout string with drill pipe through this small diameter it requires a pipe with small outer diameter.

The drill pipe run as a part of the cleanout string normally consists of different outer diameter pipe depending on the inner diameter of each section of the cased well. Typically, the larger diameter drill pipe can be racked in stands, consisting of two or more pipes pre-made up to each-other, and stored vertically on the rig floor. This allows for efficient deployment of the pipe into the hole. The smaller diameter pipe, typically pipe needed to be run inside the reservoir liner, would normally have less vertical load bearing capacity and could not be racked in stands, thus resulting in less efficient deployment of said pipe into the hole.

While running the cleanout string into the hole it will be subject to drag forces caused by the friction between the cleanout string and the cased hole. In addition, the cleanout string can be subject to other loads, e.g. differential pressure and viscous drag due to circulation of fluid down the cleanout string. These combined loads can lead to very small theoretical margin against buckling of the smaller pipe intended to go inside the reservoir liner. This is an operational risk, and in addition it can lead to slow running into the hole as a precautionary measure.

It is desired to reduce the cost and risk of the reservoir liner cleanout process.

BRIEF SUMMARY OF THE DISCLOSURE

According to the invention, a process for cementing and cleaning a reservoir liner comprises: installing a reservoir liner in a distal portion of a wellbore by running drill pipe into the wellbore, the drill pipe being fitted with an assembly on the distal end of the drill pipe, the assembly including a reservoir liner hanger and a surface-actuatable valve suitable for sealing the reservoir liner (the interior or bore of the reservoir liner) from an upper, cased part of the wellbore (the interior or bore of the casing). The drill string does not extend into the reservoir liner, or not to any substantial degree. After this, cement is passed through the drill pipe and into the reservoir liner, directly followed by completion fluid; that is to say, completion fluid is used to displace the cement instead of drilling mud being used for this purpose. Those skilled in this art will be aware of what completion fluid is—essentially it is any fluid which can support a completion operation, i.e. which does not have to be displaced out of the cased well before a completion operation can be conducted. Often it is water or brine or some other aqueous solution; however, some completion fluids are oil-based. The completion fluid displaces the cement and forces it to pass back up an annulus between the reservoir liner and rock; the valve is then actuated, thereby sealing the reservoir liner at or near the top thereof by means of the valve.

In this way, the reservoir liner is cleaned by the wiper plug followed by completion fluid, simultaneously with the displacement of cement. The cleaned reservoir liner is filled with completion fluid. This means the elimination of the step of running a cleaning string which includes a delicate narrow section, such as is normally needed to clean the liner. Considerable time is thereby saved since the delicate narrow cleaning string must be run in slowly and carefully to avoid damage to the string.

Previous attempts by the inventor to run reservoir liner cementing operations in this way have not used a valve to seal the top of the reservoir liner after displacement of cement. Most of these trial jobs have been unsuccessful because of debris, e.g. settlings of barite or other weighting material in the mud, cement residuals, etc., falling into the completion fluid filled reservoir liner from the upper, cased part of the well which still contains drilling mud. For this reason, the valve has been incorporated into the design, to seal-off the interior of the reservoir liner completely from the interior of the cased well above. This allows time to pull out the drill string and run in with a clean out string to the top of the closed valve, circulate clean and displace the upper, cased part of the well to completion fluid, without risk of debris falling into the reservoir liner. No such valve is used in the conventional process where cement is displaced using mud; the conventional process includes running pipe inside the reservoir liner, with intention to circulate clean with mud, then running a wash train and finally displacing to completion fluid.

The valve may be actuatable by withdrawal of the drill pipe after setting the reservoir liner hanger, by displacing a ball down the string, by changing the fluid pressure or by any other means known to those skilled in this art.

Also according to the invention apparatus for cementing and cleaning a reservoir liner is provided, where the apparatus comprises a drill pipe having an assembly fitted to a distal end thereof, the assembly comprising a reservoir liner hanger and a surface-actuatable valve adapted, on actuation, to seal an upper, cased part of the wellbore from the reservoir liner.

The valve may be actuated by any of the methods described above. Possible types of valve include a ball valve, which in addition to preventing debris falling into the liner can also be used as a barrier in the other direction, e.g. in case of a leak in the reservoir liner. An alternative is a flapper valve.

The valve may be incorporated into the reservoir liner hanger assembly or may be a separate component.

BRIEF DESCRIPTION OF THE DRAWINGS

A more complete understanding of the present invention and benefits thereof may be acquired by referring to the following description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
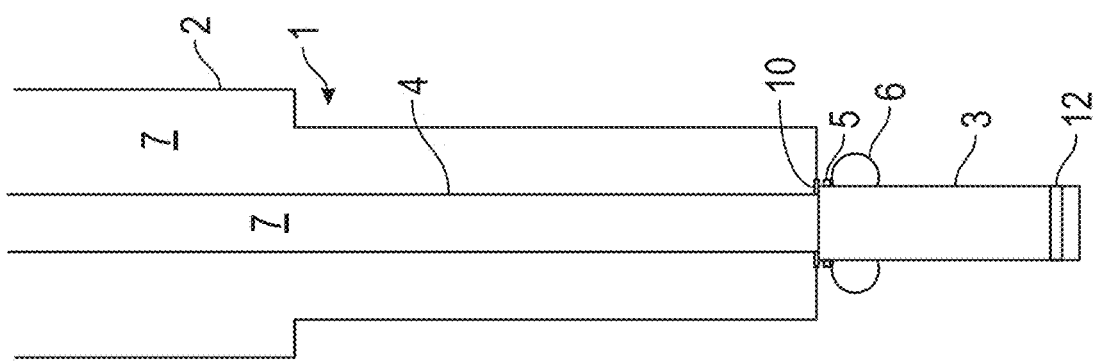
FIG. 1 is a schematic sectional view of a wellbore comprising an upper, cased, region and a reservoir liner installed beneath that, with a valve at the top of the reservoir liner open, prior to a cementing operation.

Referring firstly to FIG. 1, a wellbore 1 comprises an upper, cased part 2 underneath which is a reservoir liner 3. Extending through the wellbore approximately to the junction between the upper part 2 and reservoir liner 3 is a drill string 4. At the distal end of the drill string is an assembly comprising a reservoir liner hanger 5, associated reservoir liner hanger running tool 10, which in FIG. 1 is connected to the reservoir liner hanger, and a ball valve 6.

At the stage illustrated in FIG. 1, the reservoir liner 3 has been placed by the drill string 4 at a desired depth. The reservoir liner hanger 5 has not yet been set. The wellbore is filled with drilling mud 7 to balance the well. In an alternative method, the reservoir liner hanger is set before the cement is displaced.

Figure 2:
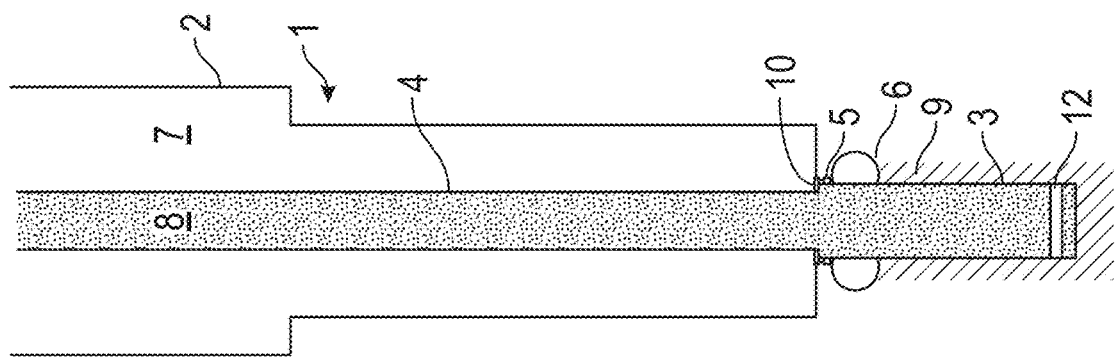
FIG. 2 is a schematic sectional view of the wellbore after cementing of the reservoir liner.

Referring to FIG. 2, a cementing job is now performed by introducing cement into the drill string 4. A volume of cement sufficient to fill the annulus around the reservoir liner 3 is introduced into the drill string 4, immediately followed by a cleaning plug (cementing plug) and completion fluid 8 (in this case, brine). As the completion fluid displaces the cement through the reservoir liner 3, the cleaning plug substantially prevents cement being left on the reservoir liner interior wall.

An appropriate volume of completion fluid 8 is pumped down the drill string 4 to displace all the cement into the annulus. Cement filling the annulus is shown at 9 in FIG. 2. At this point the drill string 4 and the entire length of the internal bore of the reservoir liner 3 are filled with brine 8. The reservoir liner hanger will now be set, anchoring the reservoir liner 3 to the upper, cased part 2 and creating a continuous seal between these.

Figure 3:
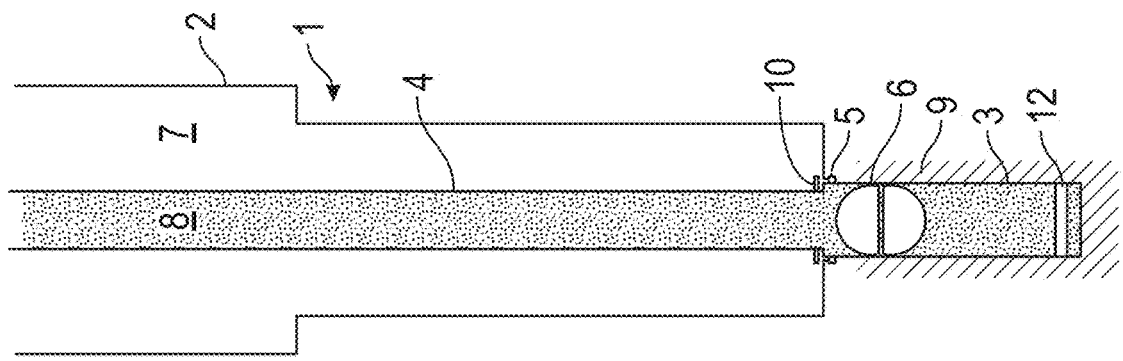
FIG. 3 is a schematic sectional view of the wellbore with a valve at the top of the reservoir liner closed.

The drill string 4 is then withdrawn slightly so that its distal end, with the reservoir liner hanger running tool 10, is detached from and right above the reservoir liner hanger 5. This action closes the ball valve 6 by pulling a shifting tool past a shifting profile (a technique for actuating down-hole components which is well known in this field). This state is shown in FIG. 3. The ball valve 6 keeps the completion fluid 8 in the reservoir liner 3 separated from the upper, cased well volume 2 above, i.e. prevents debris from the upper part of the well from falling into the reservoir liner. The closing of the valve 6 is not limited to pulling a shifting tool past a shifting profile, but could also be achieved by a clock timer, pressure pulses, or any other technique known generally in this field. The ball valve 6 could be replaced by any suitable type of mechanical valve, e.g. a flapper valve, but a ball valve is preferred because the ball valve can also act to prevent fluid flow in the opposite sense, e.g. as a barrier in case of a leak in the reservoir liner.

Figure 4A:
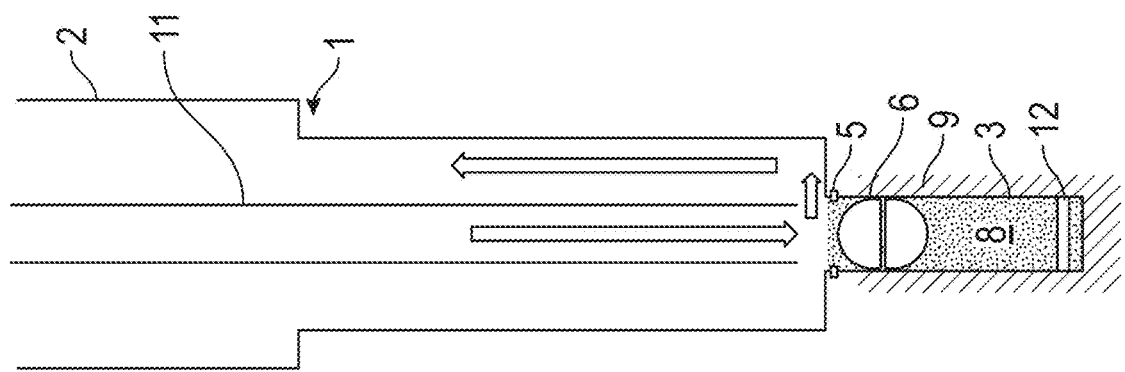
FIG. 4 is a schematic sectional view of the wellbore showing circulation of mud in the upper part of the well above the closed off reservoir liner and FIG. 4*a* is a similar view showing a cleanout string in the upper part of the well.
Figure 4:
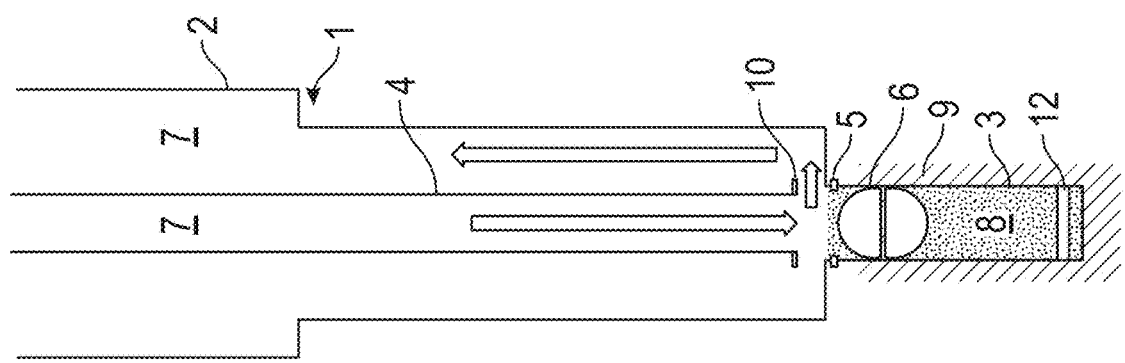

The well volume above the valve can now be circulated with mud to remove residual cement and other debris, and the drill pipe string with reservoir liner hanger running tool 10 will thereafter be retrieved to surface. This is shown in FIG. 4.

Normally, a cleanout string 11 (see FIG. 4*a*) would now be run in hole, but this can be a relatively robust string, no part of which is designed to pass down the reservoir liner. The cleanout string is only passed down as far as the distal part of the upper, cased region of the well, in the vicinity of the top of the closed valve 6. The well above the closed valve can now be cleaned out by pumping mud, the wash train—consisting of e.g. soap and viscous pills—and then displacing to completion fluid.

Figure 5:
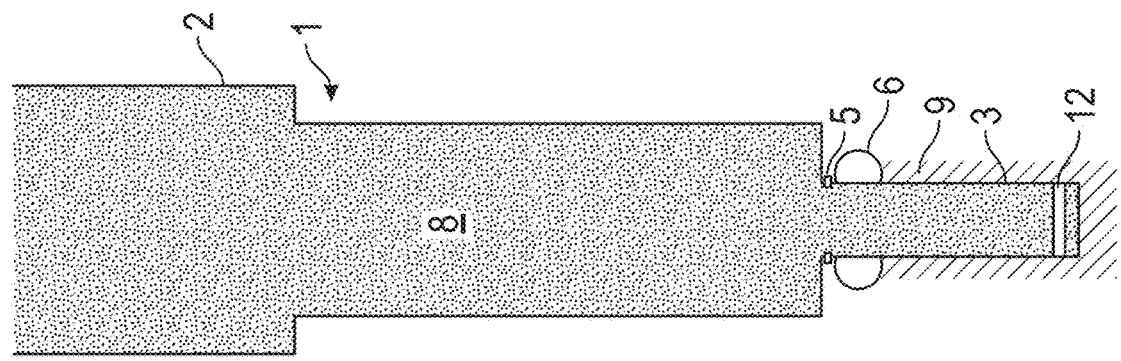
FIG. 5 is a schematic sectional view of the wellbore showing the valve at the top of the reservoir liner open and the entire wellbore filled with completion fluid.

After having displaced the well above the closed valve to completion fluid the valve can be opened, prior to installing the upper completion. This is shown in FIG. 5.

The intention with the closed valve 6 is to isolate the completion fluid in the reservoir liner which was left in hole after cementing the reservoir liner, from dirty fluids above, until the well above the valve has been cleaned out and displaced to completion fluid. The particulate material in drilling mud which is added to increase weight (density), such as e.g. barite, tends to settle out over time. Settling occurs especially at elevated temperatures (i.e. the settling might increase over time as the temperature of the displaced fluids increases and approaches the surrounding temperatures), and the settled material may enter the cleaned reservoir liner. This issue is mitigated by having a closed valve between the mud and the completion fluid below, so that no drilling mud material settles into the reservoir liner. At the same time, the reservoir liner is also kept free of other contaminants such as residual cement in the upper, cased region.

An advantage with a ball valve is that it can be of the type which allows two-way sealing; such a valve can also act as a well barrier towards the reservoir in case of a leaking reservoir liner.

A possible concern with this procedure arises with the completion fluid being heated after it has been introduced into the reservoir liner. Temperatures at the sort of depths at which reservoir liners are placed (1000s of metres under the seabed) can be considerably higher than surface ambient temperature, e.g. of the order of 100 to 180 degrees Celsius. Therefore, the completion fluid, which is at surface temperature when introduced, may heat up and expand after the valve 6 has been closed.

The distal end of the reservoir liner is often sealed, as is conventional, which means the interior of the reservoir liner is a sealed chamber (the seal is not shown in the schematic drawings, but many reservoir liners would have such a seal). There is, therefore, the potential for damage to the reservoir liner or the valve 6 or the seal at the distal end of the reservoir liner. For the above reason, a pressure release valve such as a burst disc 12 may be incorporated into the reservoir liner, e.g. at the distal end of the reservoir liner. This is shown in the schematic drawings at 12; such valves are commonplace in themselves, and the skilled person in this field would have no difficulty in identifying a suitable valve and incorporating it into the reservoir liner.

Alternatively, or in addition, the completion fluid may be heated before passing it down the drill string and into the reservoir liner, or pumped slowly so it heats up on the way down, so that it is closer to the temperature of the rock when placed at the appropriate depth.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventor that variations and equivalents of the invention are within the scope of the claims while the description, abstract and drawings are not to be used to limit the scope of the invention. The invention is specifically intended to be as broad as the claims below and their equivalents.

The invention claimed is:

1. Apparatus for cementing and cleaning a reservoir liner, the apparatus comprising:
   (a) a drillpipe having an assembly fitted to a distal end thereof, the assembly comprising a reservoir liner hanger and a surface-actuatable valve adapted, on actuation, to seal the interior of the reservoir liner completely from the interior of a casing in the wellbore above the reservoir liner, wherein the reservoir liner includes a pressure release valve; and
   (b) a cleanout string, no part of which is designed to pass down the reservoir liner, wherein the cleanout string comprises tubing that can be racked in stands, a stand consisting of two or more sections of pipe pre-made up to each-other.

2. Apparatus as claimed in claim 1 wherein the valve is actuatable by withdrawal of the drill pipe or other movement of the drill pipe.

3. Apparatus as claimed in claim 1 wherein the valve is actuatable by dropping a ball.

4. Apparatus as claimed in claim 1 wherein the valve is actuatable by changing the pressure applied to the fluid in the wellbore.

5. Apparatus as claimed in claim 1 wherein the valve is incorporated into the reservoir liner hanger assembly.

6. Apparatus as claimed in claim 1 wherein the pressure release valve comprises a burst disc.

* * * * *